US007570952B2

(12) United States Patent
Woxberg et al.

(10) Patent No.: US 7,570,952 B2
(45) Date of Patent: Aug. 4, 2009

(54) ADVANCE RESOURCE ALLOCATIONS FOR ASSOCIATION STATE TRANSITIONS FOR WIRELESS LAN SYSTEM

(75) Inventors: Fredrik Woxberg, V. Frolunda (SE); Lorens Almehag, Enskede (SE); Jan Lindskog, Pixbo (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 623 days.

(21) Appl. No.: 09/948,702

(22) Filed: Sep. 10, 2001

(65) Prior Publication Data
US 2003/0050068 A1   Mar. 13, 2003

(51) Int. Cl.
    *H04W 72/00* (2006.01)
(52) U.S. Cl. .............. 455/450; 455/464; 455/451; 455/452.1; 455/452.2; 455/455; 455/507; 455/509; 370/338; 370/310.1; 370/310.2; 370/311; 370/312; 709/226; 709/229
(58) Field of Classification Search .......... 455/450, 455/451, 452.1, 452.2, 455, 507, 509–517, 455/464; 370/449–463, 338, 310.1, 310.2, 370/311, 312; 709/208–211, 225, 226, 229
See application file for complete search history.

(56) References Cited
U.S. PATENT DOCUMENTS

| 5,159,592 | A | 10/1992 | Perkins |
| 5,590,133 | A | 12/1996 | Billström et al. |
| 5,602,836 | A | 2/1997 | Papadopoulos et al. |
| 5,640,395 | A | 6/1997 | Hamalainen et al. |
| 5,732,076 | A | 3/1998 | Ketseoglou et al. |
| 5,732,353 | A | 3/1998 | Haartsen |

(Continued)

FOREIGN PATENT DOCUMENTS
EP         0 709 982 A1    5/1996

(Continued)

OTHER PUBLICATIONS
ETSI TS 101 761-2 V1.2.1 (Apr. 2001).*

(Continued)

*Primary Examiner*—Alexander Eisen
*Assistant Examiner*—Aung T Win
(74) *Attorney, Agent, or Firm*—Nixon & Vanderhye, P.C.

(57) ABSTRACT

A central controller (CC) [22] of a wireless Local area network (LAN) [20], in conjunction with an association operation with a mobile terminal [24] and upon receiving from the mobile terminal (MT) a first control signal [CS1] of a sequence of control signals involved in the association operation, pre-reserves a MAC resource for transmission of at least a further control signal in the sequence. The MAC resource for the further control signal is pre-reserved prior to information for the further control signal being stored in a transmission buffer [58] of the mobile terminal. In essence, judging from the nature of the first control signal, the central controller (CC) anticipates eventuality of the further control signal and pre-reserves the MAC resource for the further control signal. The central controller (CC) pre-reserves the MAC resource to avoid transmission of a separate message to request a MAC resource for the further control signal. The association operation for which the pre-reservation occurs can be, for example, an initial association scenario or a handover scenario in which the mobile terminal (MT) is handed over to the central controller (CC).

56 Claims, 10 Drawing Sheets

U.S. PATENT DOCUMENTS

| | | |
|---|---|---|
| 5,787,080 A | 7/1998 | Hulyalkar et al. |
| 5,852,405 A | 12/1998 | Yoneda et al. |
| 5,892,796 A | 4/1999 | Rypinski |
| 5,896,375 A | 4/1999 | Dent et al. |
| 5,940,381 A | 8/1999 | Freeburg et al. |
| 5,963,945 A * | 10/1999 | Pal .............................. 707/10 |
| 5,970,062 A | 10/1999 | Bauchot |
| 6,031,832 A | 2/2000 | Turina |
| 6,052,594 A | 4/2000 | Chuang et al. |
| 6,061,346 A | 5/2000 | Nordman |
| 6,097,707 A | 8/2000 | Hodzic et al. |
| 6,108,314 A | 8/2000 | Jones et al. |
| 6,108,546 A | 8/2000 | Kusaki et al. |
| 6,128,287 A | 10/2000 | Freeburg et al. |
| 6,157,614 A | 12/2000 | Pasternak et al. |
| 6,198,728 B1 | 3/2001 | Hulyalkar et al. |
| 6,546,001 B1 * | 4/2003 | Semper et al. ............... 370/349 |
| 6,671,284 B1 * | 12/2003 | Yonge et al. ................. 370/462 |
| 6,671,495 B1 * | 12/2003 | Lappetelainen et al. .. 455/67.11 |
| 6,701,151 B2 * | 3/2004 | Diachina et al. ......... 455/452.1 |
| 6,721,566 B2 * | 4/2004 | Longoni et al. ............. 455/436 |

FOREIGN PATENT DOCUMENTS

| | | |
|---|---|---|
| EP | 0 738 061 A2 | 10/1996 |
| EP | 1 180 907 A2 | 2/2002 |
| WO | 96/31036 A1 | 10/1996 |
| WO | WO 98/27747 * | 6/1998 |
| WO | WO 00/60796 * | 4/2000 |
| WO | WO200060796 * | 10/2000 |

OTHER PUBLICATIONS

International Search Report mailed Jan. 7, 2003 in corresponding PCT application No. PCT/SE02/01523.

* cited by examiner

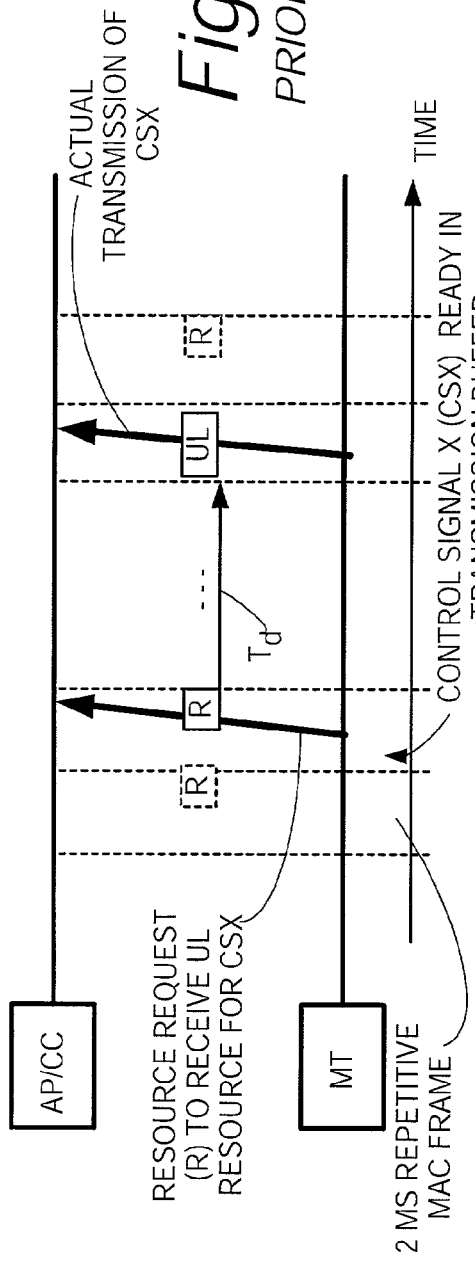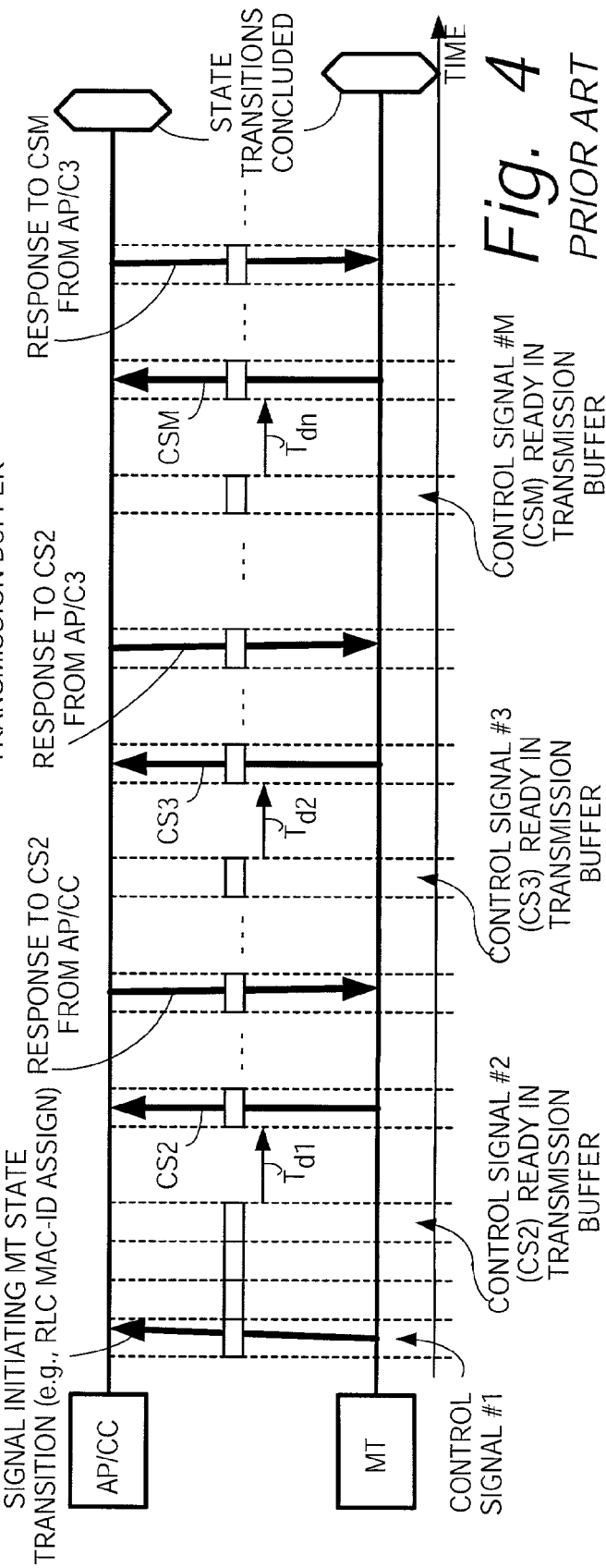
Fig. 3 PRIOR ART
Fig. 4 PRIOR ART

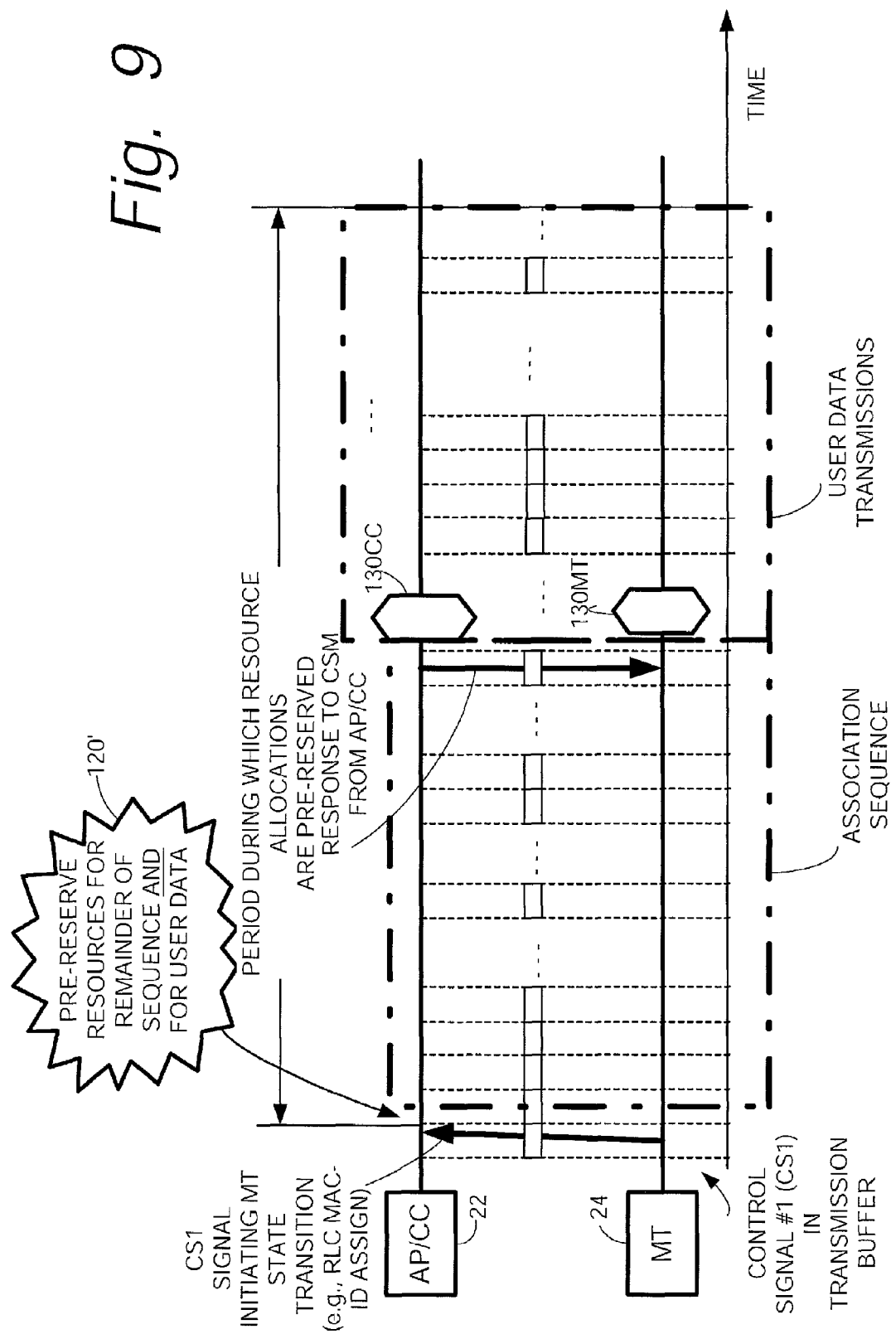

ADVANCE RESOURCE ALLOCATIONS FOR ASSOCIATION STATE TRANSITIONS FOR WIRELESS LAN SYSTEM

BACKGROUND

1. Field of the Invention

The present invention pertains to wireless local area network (LAN) communications, and particularly to allocation of resources during an associated state transition for, e.g., an initial association or a handover.

2. Related Art and Other Considerations

A wireless local area network (LAN) typically has plural mobile terminals (MTs) and an Access Point (AP). The Access Point is typically an interface unit serving as the interface towards the fixed network (i.e. the link from the wireless network to the wired network). In many applications the purpose of the AP is mainly to administrate the air interface (e.g., allocate Medium Access Control [MAC] resources) and to make the MT's connection as similar to an ordinary cable connection as possible.

HIPERLAN Type 2 (H2) is a new standard for wireless LAN systems. HIPERLAN Type 2 (H2) is described in documentation such as the following: (1) ETSI TS 101 761-1 V1.2.1—HiperLAN Type 2 Data Link Control, Part 1 Basic Data Transport Functions; and (2) ETSI TS 101 761-1 V1.2.1—HiperLAN Type 2 Data Link Control, Part 2 Radio Link Control sublayer. For HIPERLAN Type 2 (H2), the Medium Access Control (MAC) layer is a connection-oriented, reservation-based time division multiple access (TDMA) MAC layer.

In HIPERLAN Type 2 (H2), the Access Point (AP) is also called the central controller (CC) in order to generalize its functions, and to reflect the fact that the resource allocation responsibility does not necessarily have to be located in a node (such as an Access Point) which acts towards the network. Accordingly, irrespective of location, the central controller (CC) is herein sometimes referred to also as the "AP/CC". As explained in more detail below, the central controller (CC) both administrates the MAC protocol and the allocation of resources inside it.

The central controller (CC) manages the MAC frame. The MAC frame is a fixed TDMA frame which always starts with a beacon (BCH) obtained from the AP/CC. The transmitted beacon serves, among other things, to point out certain time slots, e.g., RACH slots, which could be used for, e.g., initiating control signalling. The initiating of control signaling can involve, for example, the mobile terminal (MT) using RACH slots to send Resource Requests (RRs). The Resource Requests (RRs) serve to request UL traffic resources in the MAC frame to be used for control signals (e.g., RLC messages).

The central controller (CC) collects the Resource Requests (RRs) from one or more mobile terminals (MTs) comprising the wireless LAN and, based on the received/collected requests from all such MTs, allocates resources for both downlink (DL) and uplink (UL) traffic. The allocated resources include Dedicated Control Channels (DCCHs) for control data (e.g., control signals, such as the RLC signals) and (UDCHs) for user data. In general there are no differences between requesting resources for control signals compared to requesting resources for user data. The mobile terminal (MT) only requests for an amount of Long CHannels (LCHs). For more detailed description on logical & transport channels as well as their identifiers see ETSI TS 101 761-1 V1.2.1— HiperLAN Type 2 Data Link Control, Part 1 Basic Data Transport Functions, Chapter 5.

After allocating the resources, the central controller (CC) announces the allocations in the Frame Control Channel (FCCH). Such announcement and the Frame Control Channel (FCCH) are described in ETSI TS 101 761-1 V1.2.1— HiperLAN Type 2 Data Link Control, Part 1 Basic Data Transport Functions, Chapter 6.3.

Of particular interest is the control signaling (e.g., control signals) utilized either (1) to initially associate a mobile terminal (MT) with a CC/AP, or (2) to handover a mobile terminal (MT) to the CC/AP. In this regard, in either the initial association scenario or the handover scenario the mobile terminal (MT) transitions through a respective series of association states. The association states differ depending on whether an initial association scenario or a handover scenario is in effect. FIG. 1 shows an example of association states for an initial association scenario, in which the task is for the MT to as quickly as possible move from state MT_Disassociated_from_AP to state MT_Associated_to_AP, and also then on to state Associated_CL_Broadcast_Joined and state DUC_ Established. These states are described in Chapters 5.1.1, 5.1.1, 5.1.5, and 5.3.1, respectively, of ETSI TS 101 761-1 V1.2.1—HiperLAN Type 2 Data Link Control, Part 2 Radio Link Control sublayer. FIG. 2 shows an example of association states for a handover scenario, in which the task is for the mobile terminal (MT) to as quickly as possible move from state MT_Associated_with_old_AP to state HO_Completed_ to_new_AP, and also then on to state Associated CL Broadcast Joined and to state DUC Established. These states are described in Chapters 5.2.1.3, 5.2.1.3, 5.1.5, and 5.3.1, respectively of ETSI TS 101 761-1 V1.2.1—HiperLAN Type 2 Data Link Control, Part 2 Radio Link Control sublayer.

As part of the transition through these association states, the mobile terminal (MT) transmits a sequence of control signals (e.g., Radio Link Control [RLC] messages) to the central controller (CC). However, according to present convention, prior to sending each such control signal of the sequence the mobile terminal (MT) must request resources for sending the control signal. Moreover, according to current convention, the mobile terminal (MT) is only allowed to request resources corresponding to what is currently pending in its transmission buffers. The requested resources, e.g., the resources sought, include appropriate Dedicated Control Channel(s) (DCCH) in the MAC frame to be used for the control signal. The request for resources itself takes the form of a separate message from the mobile terminal (MT) to the central controller (CC), which typically uses a Random Access Channel (RACH). In other words, when no resources have been allocated by the central controller (CC), the mobile terminal (MT) must use the RACH in order to request new resources for the control signal.

For an initial association scenario (see FIG. 1), the mobile terminal (MT) decides for itself with which AP/CC to associate. The first association request to the AP/CC takes the form of a ASCH/RCH message RLC_MAC-ID_ASSIGN (see, ETSI TS 101 761-1 V1.2.1 HiperLAN Type 2 Data Link Control, Part 2 Radio Link Control sublayer, Chapter 5.1.1.2). At this juncture the MT is not known to the central controller (CC), and thus it can only use generally available contention slots (i.e. the RACH area). See, ETSI TS 101 761-1 V1.2.1—HiperLAN Type 2 Data Link Control, Part 1 Basic Data Transport Functions, Chapters 6.3.2.5 & 6.3.3. The purpose of the RLC_MAC-ID_ASSIGN message is only to obtain a MAC-ID in order to be able to initiate association & connections setup procedures. Association then also includes capabilities negotiations, start-of-encryption, authentication etc., as described, e.g., in ETSI TS 101 761-1 V1.2.1—HiperLAN Type 2 Data Link Control, Part 2 Radio Link Control sublayer, Chapter 5.1.1. Both association and connections setup procedures must be concluded before any user data exchange can take place, and any general resource allocations applied.

As soon as a MAC-ID has been obtained, the mobile terminal (MT) may start to request UL resources for a further one of its control signals in the sequence. But the MT is only allowed to request for resources corresponding to what is pending in its transmission buffers. See, e.g., ETSI TS 101 761-1 V1.2.1—HiperLAN Type 2 Data Link Control, Part 1 Basic Data Transport Functions, Chapter 6.3.2.8. In other words, the mobile terminal (MT) can not request for "general" UL resources". As explained below, this constraint of requesting resources for a control signal only when information for the control signal is already in its transmission buffer(s) presents several problems for the mobile terminal (MT).

For every individual uplink control signal (e.g., UL RLC signal) which comprises one or more LCHs, the mobile terminal (MT) must: (1) Wait until the control signals [e.g., RLC message(s)] is/are prepared; (2) Send a Resource Request (RR) in the RACH to obtain UL resources for the LCHs; (3) Follow required procedures for accessing the RACH slots (e.g. exponential backoff in case of collisions); (4) Upon assuming a successfully transmitted Resource Request (the MT cannot definitively know promptly if a Resource Request was successful), await the coming UL allocation (for which delay also depends on the load of the central controller (CC) and its processing delay); and only then (5) transmit the control signal (e.g., RLC signal/message). Moreover, if any of the control signals are lost, each of steps (1) through (5) described above (e.g., the entire RLC function) will have to be repeated for the lost control signal.

It is generally the mobile terminal (MT) which takes the initiative to move towards the next sub-state during association and connections setup procedures by sending the next control signal (e.g., RLC message) in the sequence after successfully receiving acknowledgment of the previous. After responding to the RLC_MAC-ID_ASSIGN message, the mobile terminal (MT) can subsequently send, at appropriate successive times, the remainder of the control signals in the sequence. The identity and nature of such control signals depends on such things as, for example, the particular Convergence Layer (CL) and Application scenario. One non-limiting example of remaining control signals (taken from ETSI Draft TS 101 761-3 V0.c—Profile for Business environments, Chapters 5.2 and 5.4) are four particular association control signals and three particular connection setup control signals. The four particular association control signals are as follows: RLC_LINK_CAPABILITY (1 LCH); RLC_KEY_EXCHANGE_MT_1&_2(2 LCHs); RLC_AUTHENTICATION (the number of UL signals and the number of LCHs per signal depends on the selected authentication type); and RLC_INFO_TRANSFER (1 LCH). The three particular connection setup control signals are as follows: RLC_SETUP (1 LCH); RLC_CONNECT_ACK (1 LCH); RLC_CL_BROADCAST_JOIN (1 LCH). Thus, in the this example, the minimum number of needed LCH RLC signals in the uplink (UL) for concluding the association is at least seven. The actual number needed may increase due to lost RLC signals (which, as explained above, require RLC retransmissions). Only after concluding all of the above mentioned signal exchanges may the mobile terminal (MT) start to send and receive user data.

Handover in HIPERLAN/2 typically occurs when a mobile terminal (MT) moves within a H2 network domain as defined by NET-ID. The mechanisms to increase handover performance are, however, not limited to handovers only between two H2 service areas, but could also be applied to handovers from some other network interface to a H2 network.

From an Radio Link Control (RLC) point of view, a handover is very similar to the association procedures described above. A main difference is that the first contact with the new AP/CC is performed using a different message (RLC_HANDOVER_REQ). This RLC_HANDOVER_REQ message activates Access Point (AP) handover mechanisms for backbone communication with previous Access Points (APs) in order to, e.g., forward the MT's attributes, user data etc. After responding to the RLC_HANDOVER_REQ message, the mobile terminal (MT) can subsequently send, at appropriate successive times, the remainder of the control signals in the sequence. The identity and nature of such control signals depends on such things as, for example, the particular Convergence Layer (CL) and Application scenario. One non-limiting example of remaining control signals (taken from ETSI Draft TS 101 761-3 V0.c—Profile for Business environments, Chapters 5.2 and 5.4) are the four particular association control signals and three particular connection setup control signals described above in connection with the initial association scenario. Thus, in this example handover scenario (as in the initial association scenario for this example), the minimum number of needed LCH RLC signals in the uplink (UL) for concluding the handover is at least seven. The actual number needed may increase due to lost RLC signals (which, as explained above, require RLC retransmissions). Only after concluding all of the above mentioned signal exchanges may the mobile terminal (MT) start to send and receive user data.

For user data connections sent over the User Data Channel (UDCH), there are three modes of operation for allocation of resources. In a first mode, also known as the "basic type of allocation", all requests for resources are performed dynamically as the data arrives. The requesting entity (e.g., the mobile terminal (MT)) is only allowed to request for resources corresponding to what is currently pending in its transmission buffers. When no resources are allocated by the central controller (CC) the requesting entity must use the RACH in order to request new resources.

A second mode of allocation of resources for user data connections is also known as the "fixed capacity agreement" mode. In the fixed capacity agreement mode, the requesting entity [e.g., the mobile terminal (MT)] and the central controller (CC) agree upon a fixed amount of resources to be allocated at certain time intervals for the user data. Additional resources can also continuously be requested in the same way as for the basic type of allocation mode.

A third mode of allocation of resources for user data connections is also known as the "fixed slot allocation" mode. In the fixed slot allocation mode, the requesting entity and the central controller (CC) agree upon fixed resource slots to be allocated in the MAC frames for the user data. Additional resources can also continuously be requested in the same way as for the basic type of allocation mode. The fixed slot allocation mode is described, e.g., in ETSI TS 101 761-1 V1.2.1—HiperLAN Type 2 Data Link Control, Part 1 Basic Data Transport Functions, chapter 6.3.4.

Which of the above user data resource allocation modes is to be used is negotiated between the central controller (CC) and the requesting entity during setup of the user data connections. The connection setup must thus be concluded before the requesting entity can start to request resources.

Thus, during state transition such as, e.g., during an initial association scenario or a handover scenario, no connection characteristics have yet been established. At the same time it is highly desirable to keep the time of pre-connection inactivity as short as possible. However, the sheer number of messages transmitted to request resources for control signals, and the control signals themselves, and the delay attending each such message, works against time efficiency.

In the above regard, both the initial association scenario and the handover scenario involve strict sequences of control signals in which one individual control signal exchange must be concluded before a subsequent control signal can be generated and stored in a transmission buffer of the requesting entity [e.g., the mobile terminal (MT)]. Further, and as also previously explained, since most of these control signal exchanges involve Long Channel (LCH) messages, a Resource Request message must in advance be sent using the RACH in order to procure and be granted resources (e.g., DCCH) for each control signal transmission. Having to generate a separate Resource Request message in this fashion adds at least one additional message per "useful" exchange, thereby increasing the time of inactivity. Moreover, since the RACH is a contention-based access channel, requesting resources will always involve a certain amount of uncertainty regarding whether the resource request will reach the central controller (CC). Random Access backoff mechanisms may thus come to add even more delay and then also increase the period of inactivity.

FIG. 3 illustrates the foregoing, and particularly the fact that presently in a HIPERLAN 2 wireless LAN the MT experiences delays for each attempt to transmit an UL signal containing LCHs. In FIG. 3, $T_d$ is the added delay per signal, mainly introduced because the MT must use the RACH for Resource Requests in order to obtain UL resources. More accurately, $T_d$ is defined by Expression 1:

$$T_d = \text{RACH\_Delay} + AP/CC\_RR\_\text{Proc\_delay} \qquad \text{Expression 1:}$$

In Expression 1, RACH_Delay is mainly due to two factors. The first factor is collisions with other contenders. When a collision is detected by the MT (see ETSI TS 101 761-1 V1.2.1—HiperLAN Type 2 Data Link Control, Part 1 Basic Data Transport Functions, Chapter 6.2.3), the MT is required to enter an exponential backoff scheme before trying again (see, ETSI TS 101 761-1 V1.2.1—HiperLAN Type 2 Data Link Control, Part 1 Basic Data Transport Functions, Chapter 6.3.3). The second factor is the delay added when a Resource Request is wrongly assumed as successfully transmitted. The MT must then realize for itself that a retransmission needs to be performed [concluded when no UL allocation is announced by the central controller (CC)]. The MT is not aware of the processing delays of the central controller (CC), and there are some rules preventing too aggressive behaviour of the MT (see, ETSI TS 101 761-1 V1.2.1—HiperLAN Type 2 Data Link Control, Part 1 Basic Data Transport Functions, Chapter 6.3.2.8).

In Expression 1, AP/CC_RR_Proc delay is the delay from correctly received RR in the AP/CC until an allocation is reserved and announced.

The delay $T_d$ applies to each control signal (e.g., each RLC signal transmission attempt) individually. Accordingly, the total resulting added delay for a sequence of control signals will be the accumulation of the individual delays, such accumulation being shown as $T_{dtot}$ in Expression 2 and understood with respect to FIG. 4.

$$T_{dtot} = T_{d1} + T_{d2} + \ldots + T_{dn}. \qquad \text{Expression 2}$$

The total association delay $T_A$ is provided by Expression 3.

$$T_A = T\_RLC\_\text{Processing} + T_{dtot} \qquad \text{Expression 3}$$

In Expression 3, T_RLC_Processing is the time needed for processing of the information contents of the RLC messages. Thus, the accumulation of the individual delays involved in using the RACH in order to request resources for each control signal (e.g., each RLC message), in serial fashion, significantly lengthens the inactivity period involved in an initial association scenario or a handover scenario in a wireless LAN system.

What is needed, therefore, and an object of the present invention, is a technique for reducing the time required to perform an association operation between a requesting entity and a central controller (CC) of a wireless LAN.

BRIEF SUMMARY

A central controller (CC) of a wireless local area network (LAN), in conjunction with an association operation with a mobile terminal and upon receiving from the mobile terminal (MT) a first control signal of a sequence of control signals involved in the association operation, pre-reserves a MAC resource for transmission of at least a further control signal in the sequence. The MAC resource for the further control signal is pre-reserved prior to information for the further control signal being stored in a transmission buffer of the mobile terminal. In essence, judging from the nature of the first control signal, the central controller (CC) anticipates eventuality of the further control signal and pre-reserves the MAC resource for the further control signal. The central controller (CC) pre-reserves the MAC resource to avoid transmission of a separate message to request a MAC resource for the further control signal. In a preferred embodiment, the central controller (CC) pre-reserves MAC resources for the remaining control signals in the sequence. The association operation for which the pre-reservation occurs can be, for example, an initial association scenario or a handover scenario in which the mobile terminal (MT) is handed over from an old access point/central controller (AP/CC) to a new access point/central controller (AP/CC) with which it becomes associated. After the pre-reservation, the mobile terminal always has an uplink slot available for the remaining control signals in the sequence as a result of the central controller (CC) having pre-reserved the MAC resource. Optionally, the central controller (CC) can notify the mobile terminal (MT) 24 [using the Frame Control CHannel [FCCH] of the MAC frame] that the central controller (CC) has pre-reserved the MAC resources.

The MAC resource which is pre-reserved by the central controller (CC) can be any suitable resource. In terms of HyperLAN2 terminology, such MAC resources include one or more of: (1) an uplink Dedicated Control Channel (DCCH) Long Channel (LCH); (2) an uplink Dedicated Control Channel (DCCH) Short Channel (SCH); (3) a downlink Dedicated Control Channel (DCCH) Long Channel (LCH); (4) a downlink Dedicated Control Channel (DCCH) Short Channel (SCH); and (5) a combination of (1), (2), (3), or (4).

In one of its aspects, the central controller (CC) temporarily pre-reserves the MAC resource. For example, in one mode the central controller (CC) pre-reserves the MAC resource for a predetermined time. Upon expiration of the predetermined time the central controller (CC) reverts to a non-pre-reservation allocation scheme. In another mode, the central controller (CC) pre-reserves the MAC resource until a predetermined state transition has occurred. For example, the central controller (CC) pre-reserves the MAC resource until the central controller (CC) receives a signal from which the central controller (CC) can conclude that the mobile terminal has successfully entered a predetermined state.

Another aspect of the invention involves the periodicity of occurrence of the MAC resources pre-reserved by the central controller (CC). In one mode, the central controller (CC)

pre-reserves the MAC resource in each MAC frame. In another mode, the central controller (CC) pre-reserves the MAC resource in a number of MAC frames in accordance with a predetermined rule. An example of such a predetermined rule is the central controller (CC) pre-reserving the MAC resource in every second MAC frame.

In yet another aspect of the present invention, in addition to pre-reserving resources for the control signals of the association sequence, the central controller (CC) pre-reserves resources for user data (e.g., UDCHs and/or LCCHs) to be used in transmitting user data between the central controller (CC) and the mobile terminal after the association sequence is completed.

The present invention concerns the wireless LAN with a central controller (CC) which operates in accordance with the invention, the central controller (CC) itself, and a method of operating the wireless LAN. In one illustrated embodiment, the mobile terminal comprises a transceiver; a transmission buffer which stores information to be included in a control signal; and a MAC logic unit which, via the transceiver, sends the sequence of control signals to the central controller (CC) in a MAC protocol prior to sending/receiving user data.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 3 is a timing diagram depicting a conventional manner of transmitting a control signal of an association sequence.

FIG. 4 is a timing diagram depicting a conventional manner of transmitting a sequence of control signals.

FIG. 9 is a timing diagram showing both resource pre-reservation for both control signals (for an association sequence) and for user data.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

Figure 5:
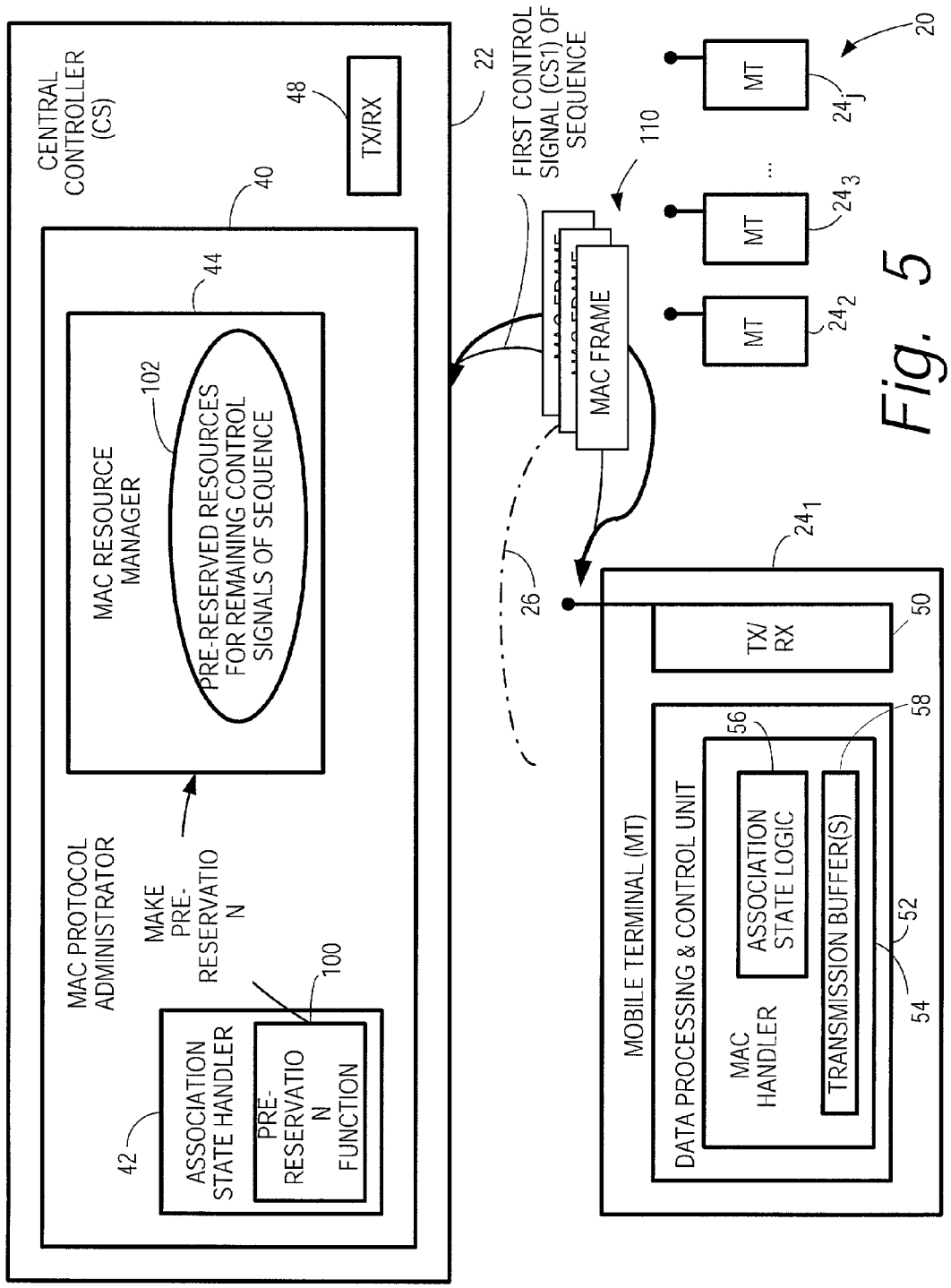
FIG. 5 is a diagrammatic view of a wireless local area network (LAN) according to an example embodiment of the present invention.

FIG. 5 shows a non-limiting, example embodiment of a wireless local area network (LAN) 20 according to an embodiment of the present invention. The wireless local area network (LAN) 20 includes a central controller (CC) 22 which serves one or more mobile terminals (MT) 24. FIG. 5 happens to show central controller (CC) 22 serving, at a certain moment in time, j number of mobile terminals $24_1$-$24_j$. Each of the mobile terminals 24 communicate over an air interface 26 with central controller (CC) 22.

While the central controller (CC) 22 has many constituent components with which the person skilled in the art is familiar, FIG. 5 illustrates various aspects of the central controller (CC) 22 which are pertinent to the present invention. In particular, FIG. 5 shows that central controller (CC) 22 has a Medium Access Control (MAC) protocol administrator 40. The MAC protocol administrator 40 includes, e.g., an association state handler 42 and a MAC resource manager 44. As mentioned previously, the central controller (CC) 22 may be located at an Access Point (AP). An Access Point (AP) can serve as an interface between a fixed network (e.g., the wired network) and the wireless LAN. In view of the fact that central controller (CC) 22 may or may not be located at an Access Point (AP), for sake of generality the central controller (CC) 22 is sometimes herein referenced as the CC/AP [which means that central controller (CC) 22 may, but does not have to be, located at an Access Point (AP)].

As mentioned above, in the illustrated example embodiment of FIG. 5, the central controller (CC) 22 communicates over air interface 26 with mobile terminals MT $24_1$-$24_j$. To facilitate communication over air interface 26, the central controller (CC) 22 also includes a transmitting and receiving section (e.g., a transceiver) 48.

FIG. 5 also illustrates various constituent components, pertinent to the present invention, of a representative mobile terminal (MT) 24. The representative mobile terminal chosen for FIG. 5 happens to be mobile terminal $24_1$, which hereinafter shall be referenced as mobile terminal 24 for simplicity. Incidentally, it should be understood that the present invention is not confined to a wireless local area network (LAN) of any particular size or number of mobile terminals.

Pertaining to the present invention, the mobile terminal 24 includes a transmitting and receiving section (e.g., a transceiver [depicted as TX/RX]) 50 and a data processing and control unit 52. The data processing and control unit 52 in turn comprises a MAC handler 54. The MAC handler 54 includes association state logic 56 and one or more transmission buffer(s) [hereinafter referenced as transmission buffer 58].

As previously explained, the present invention has particular applicability to certain association operations which can be performed by mobile terminal (MT) 24 relative to central controller (CC) 22. These association operations can include an initial association and handover. In an initial association, the mobile terminal (MT) 24, not previously in communication with this or another central controller (CC), desires to make communication with the wireless LAN. In handover, the mobile terminal (MT) 24, which has been in communication with another central controller (CC), desires instead to relate to the wireless local area network (LAN) through this central controller (CC) [which will be, in essence, a "new" central controller (CC) for the mobile terminal].

Figure 1:
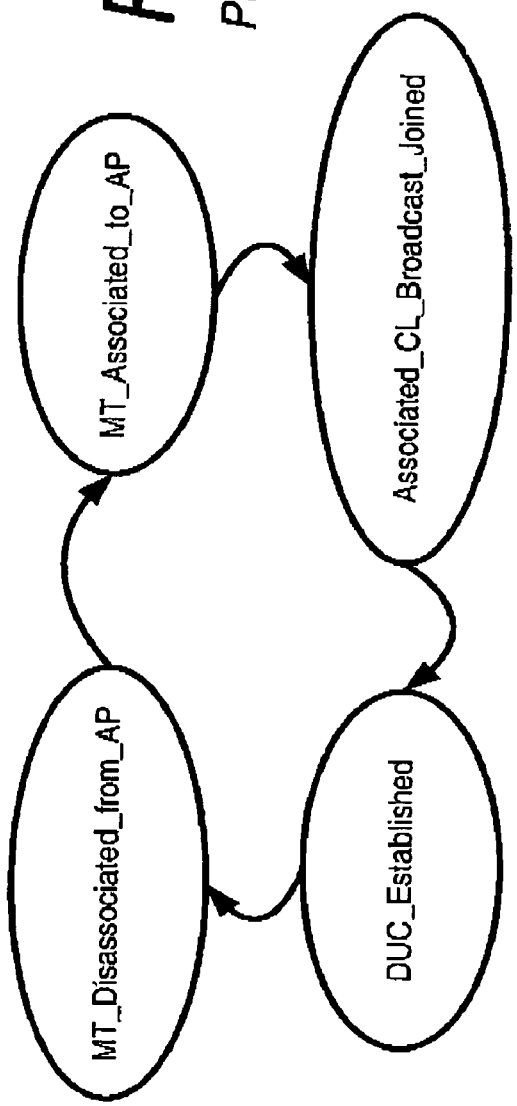
FIG. 1 is a state diagram showing example association states for an initial association scenario.
Figure 2:
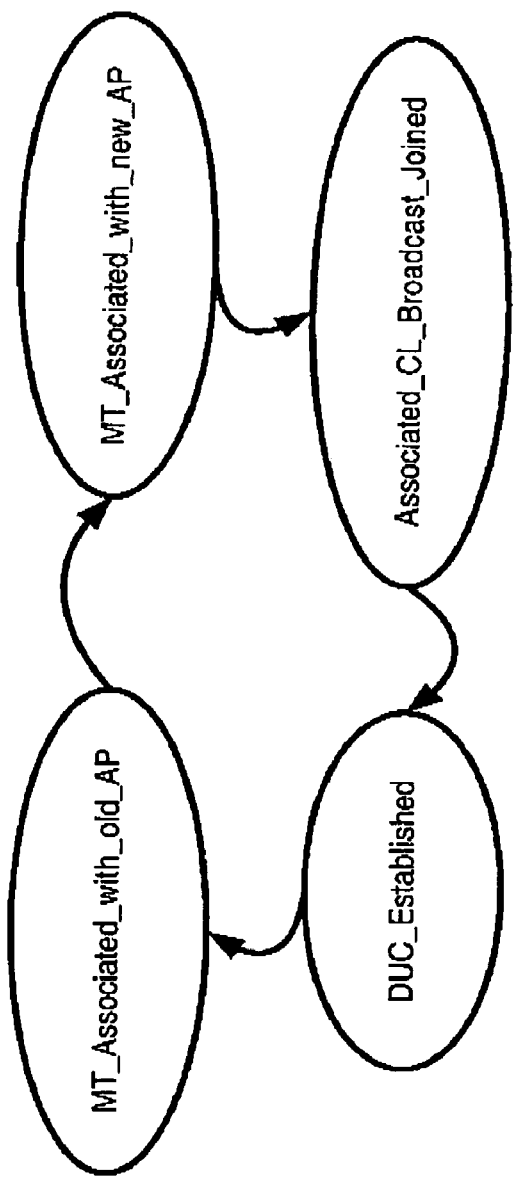
FIG. 2 is a state diagram showing example association states for a handover scenario.

The association operations, whether initial or handover, involve the mobile terminal transitioning through a series of association states and sending a sequence of control signals (e.g., an association sequence) to the central controller (CC). The association states through which the mobile terminal transitions can be those illustrated in FIG. 1 and FIG. 2, for example. Operations of the mobile terminal involved in each such association state, and the transitioning from state to state, are controlled by association state logic 56 of MAC handler 54.

In order to send to central controller (CC) 22 the control signals involved in the association sequence, the mobile terminal (MT) 24 must first obtain from central controller (CC) 22 the MAC resources (e.g., DCCHs) with which to send the control signals of the sequence. As explained previously, conventionally for each such control signal the prior art mobile terminal had to generate a new message (e.g., a Resource Request message). These separate Resource Request messages were generated over the RACH, and as such imposed significant time delay for the association operation in view of the utilization of such additional messages, the time required for processing these additional messages, and the possibility of loss or other contention-related problems attending the RACH-carried messages.

Advantageously, the central controller (CC) 22 of the present invention obviates the prior art requirement for the mobile terminal to send a Resource Request message for each control signal of the association sequence. In accordance with the present invention, the association state handler 42 of central controller (CC) 22 includes a pre-reservation function 100 which, after mobile terminal (MT) 24 sends a first control signal of an association sequence (represented by CS1 in FIG. 5), pre-reserves MAC resources for the remaining control signals in the association sequence. In essence, upon receiving a first control signal CS1 of an association sequence, the association state handler 42 predicts what MAC resources will be required for completion of the association sequence. The association state handler 42 then directs the pre-reservation function 100 to request MAC resource manager 44 to pre-reserve the necessary MAC resources. The pre-reserved MAC resources are depicted by symbol 102 in FIG. 5. The pre-reserved MAC resources are actually pre-reserved prior to information for the remaining control signals of the association sequence being stored in transmission buffer 58 of mobile terminal (MT) 24. After the pre-reservation, the mobile terminal always has an uplink slot available for the remaining control signals in the sequence as a result of the central controller (CC) having pre-reserved the MAC resource. Optionally, the central controller (CC) can notify the mobile terminal (MT) 24 of the MAC frame] that the central controller (CC) has pre-reserved the MAC resources.

The pre-reserved resources are appropriate channels in MAC frames transmitted between central controller (CC) 22 and mobile terminal (MT) 24. A series of such MAC frames 110 are shown in FIG. 5 merely for sake of illustration, it being understood that the depiction of three such MAC frames 110 is a simplification and that many MAC frames are, in fact, transmitted between central controller (CC) 22 and mobile terminal (MT) 24, on both the uplink (from mobile terminal (MT) 24 to central controller (CC) 22) and on the downlink (from central controller (CC) 22 to mobile terminal (MT) 24).

In the above regard, the MAC resources which are pre-reserved by the central controller (CC) can be any suitable resource. In terms of HyperLAN2 terminology, such MAC resources include or more of: (1) an uplink Dedicated Control Channel (DCCH) Long Channel (LCH); (2) an uplink Dedicated Control Channel (DCCH) Short Channel (SCH); (3) a downlink Dedicated Control Channel (DCCH) Long Channel (LCH); (4) a downlink Dedicated Control Channel (DCCH) Short Channel (SCH); and (5) a combination of (1), (2), (3), or (4). The person skilled in the art will appreciate that the invention is applicable to other standards besides HyperLAN2, and the resources appropriate for those other standards.

Figure 6:
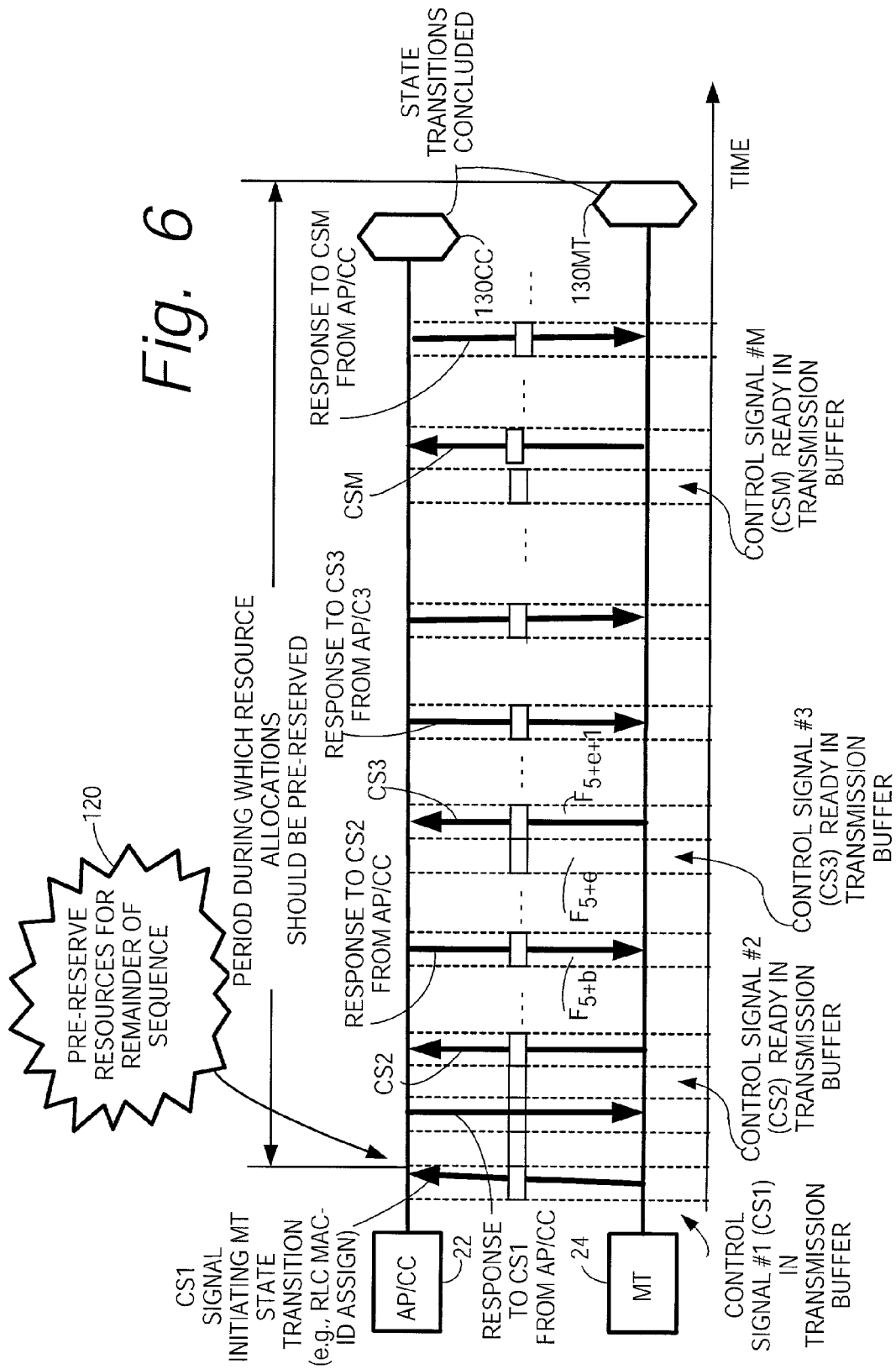
FIG. 6 is a timing diagram depicting resource pre-reservation and transmission of a sequence of control signals in accordance with the present invention.

FIG. 6 illustrates resource pre-reservation and transmission of a sequence of control signals in accordance with an example scenario of the present invention. FIG. 6, like subsequent figures, is a timing diagram wherein time increases moving from left to right along the horizontal lines. Dotted vertical lines are employed in FIG. 6 and subsequent figures to delineate MAC frames (e.g., one MAC frame exists between adjacent dotted vertical lines, except where dashes indicate one or more unillustrated MAC frames in a manner to depict a greater passage of time). In the illustrations of the figures, the MAC frames are two millisecond frames, although the invention is not confined to any particular frame length or frame structure.

FIG. 6 presumes that mobile terminal (MT) 24 has already utilized a RACH to request and receive, from central controller (CC) 22, a DCCH for transmission to central controller (CC) 22 of a first control signal (e.g., control signal CS1) of an association sequence. The requesting and receiving of the DCCH for the first control signal CS1 is in accordance with prior art practice. Moreover, FIG. 6 shows that mobile terminal (MT) 24 has, at the beginning of the time shown in FIG. 6, stored in its transmission buffer 58 information to be used for generating the first control signal CS1 of the association sequence. The spaces between the dotted vertical lines below the horizontal line extending rightward from mobile terminal (MT) 24 in FIG. 6 can be conceptualized as simulating the transmission buffer 58 [although above such horizontal line such spaces are MAC frames transmitted over the air interface].

After having received the DCCH for transmitting the first control signal CS1 of the association sequence, and with the content of the first control signal CS1 having already been stored in its transmission buffer 58, mobile terminal (MT) 24 sends the first control signal CS1 (in the first or leftmost MAC frame of FIG. 6) to central controller (CC) 22. In an implementation of the invention in which the control signals are radio link control (RLC) signals, in the initial association scenario the first control signal CS1 is a RLC MAC-ID ASSIGN signal. Upon receipt of the first control signal CS1, the association state handler 42 of central controller (CC) 22 analyzes the identity or nature of the control signal, and based on such analysis predicts that an entire association sequence of control messages will follow. Premised upon such prediction, the association state handler 42 calls upon its pre-reservation function 100. The pre-reservation function 100 works with MAC resource manager 44 to make a pre-reservation of appropriate MAC resources (indicated by symbol 102 in FIG. 5). Such pre-reservation is depicted by symbol 120 in FIG. 6. For example, the pre-reservation function 100 secures one or more DCCHs to be used for mobile terminal (MT) 24 to send further control signals of the association sequence to central controller (CC) 22 on the uplink, and one or more DCCHs to be used for central controller (CC) 22 to send response messages to mobile terminal (MT) 24 on the downlink.

Sometime after receipt of the first control signal CS1, central controller (CC) 22 sends a response message to mobile terminal (MT) 24. The response message is sent on the DCCH which has be pre-reserved for downlink communications for the association sequence. For sake of simplicity, the message sent from central controller (CC) 22 to mobile terminal (MT) 24 in response to the first control signal CS1 is shown in the third MAC frame of FIG. 6. It should be understood that the rapidity with which such a response message can be prepared and transmitted may depend on many factors, and that the unusually short time illustrated in FIG. 6 is merely for graphical convenience.

The particular MAC frame which carries the response message to control signal CS1 includes a Frame Control CHannel [FCCH]. Among other things, the Frame Control CHannel [FCCH] announces available control channels to the mobile terminal (MT) 24. In view of the pre-reservation, from the perspective of the mobile terminal (MT) 24 there will always be control channel opportunities available on the uplink. Standard rules then regulate the use of available control channel opportunities.

In view of the pre-reservation of resources, as soon as mobile terminal (MT) 24 has the content necessary to generate the second control signal CS2 of the sequence in its transmission buffer 58, the MAC handler 54 of mobile terminal (MT) 24 can send the second control signal CS2 to central controller (CC) 22. FIG. 6 shows the transmission buffer 58 of mobile terminal (MT) 24 having the complete signal content of signal CS2 at the time of the fourth MAC frame, so that the control signal CS2 can be sent during the fifth MAC frame of FIG. 6. As an important advantage, in view of the pre-reservation performed by central controller (CC) 22, mobile terminal (MT) 24 does not need to send a separate message to central controller (CC) 22 in order to request MAC resources for the second control signal CS2.

Eventually a response to the second control signal CS2 is received in the pre-reserved downlink DCCH for the association sequence. FIG. 6 shows such response to the second control signal CS2 as being sent in MAC frame $F_{5+b}$. FIG. 6 further shows that subsequently, at the time of frame $F_{5+e}$, the mobile terminal (MT) 24 has informational contents for control signal CS3 stored in its transmission buffer 58. Thereafter, such as in frame $F_{5+e+1}$, mobile terminal (MT) 24 can send the third control signal CS3 of the association sequence to central controller (CC) 22. The third control signal is transmitted in the pre-reserved uplink DCCH for the association sequence. Again, advantageously no separate resource reservation message need be sent in order to obtain an uplink channel upon which to send the third control signal (or any other remaining control signal in the association sequence).

The storing in transmission buffer 58 of informational content for a control signal, the transmission of the control signal using the pre-reserved uplink DCCH, and the eventual transmission of return message responsive to the control signal (in the pre-reserved downlink DCCH) continue in like manner for each of the remaining control signals in the association sequence, culminating with the last control signal CSM. Some time after transmission from central controller (CC) 22 of the response to the last control signal CSM, the state transitions in central controller (CC) 22 and mobile terminal (MT) 24 are terminated as indicated by respective symbols 130CC and 130MT in FIG. 6.

As indicated previously, in one example context of utilization (see, ETSI Draft TS 101 761-3 V0.c—Profile for Business environments, Chapters 5.2 and 5.4), the first control signal CS1 of an initial association sequence is the RLC_MAC-ID_ASSIGN message, and the remaining control signals (e.g., control signals CS2 through CSM) of the association sequence are the following messages: RLC_LINK_CAPABILITY (1 LCH); RLC_KEY_EXCHANGE_MT_1&_2 (2 LCHs); RLC_AUTHENTICATION (the number of UL signals and the number of LCHs per signal depends on the selected authentication type); RLC_INFO_TRANSFER (1 LCH); RLC_SETUP (1 LCH); RLC_CONNECT_ACK (1 LCH); RLC_CL_BROADCAST_JOIN (1 LCH). In the same context of utilization, the control signal CS1 of an initial association sequence is the RLC_HANDOVER_REQ message, and the remaining control signals are the same as for the initial association sequence.

Thus, the present invention guarantees MAC resources (e.g., uplink MAC channels) at least temporarily. These MAC resources are pre-reserved by pre-reservation function 100 upon realization that a first control signal of an association sequence has been received. In other words, the pre-reservation/allocation of the MAC resources for the association sequence is triggered by the AP/CC realizing that (for an initial association sequence) the RLC_MAC-ID_ASSIGN message may be followed by more uplink traffic control signals (e.g., UL RLC traffic messages). By virtue of pre-reservation function 100 of central controller (CC) 22 making the pre-reservation, the MT can avoid having to use the RACH in order to request resources separately for each ensuing control signal of the association sequence. The pre-reservation provided by pre-reservation function 100 thus vastly improves the association operation and the connection setup performance for each individual control signal (e.g., RLC signal), as depicted on a per signal basis in FIG. 7.

The downlink MAC channels which are utilized for an association sequence can also be pre-reserved in the same manner as the uplink MAC channels. Alternatively, a downlink resource administration function can be configured to ensure that its downlink control signaling has a sufficiently high priority that the resource allocation facilitates a comparable result.

Figure 7:
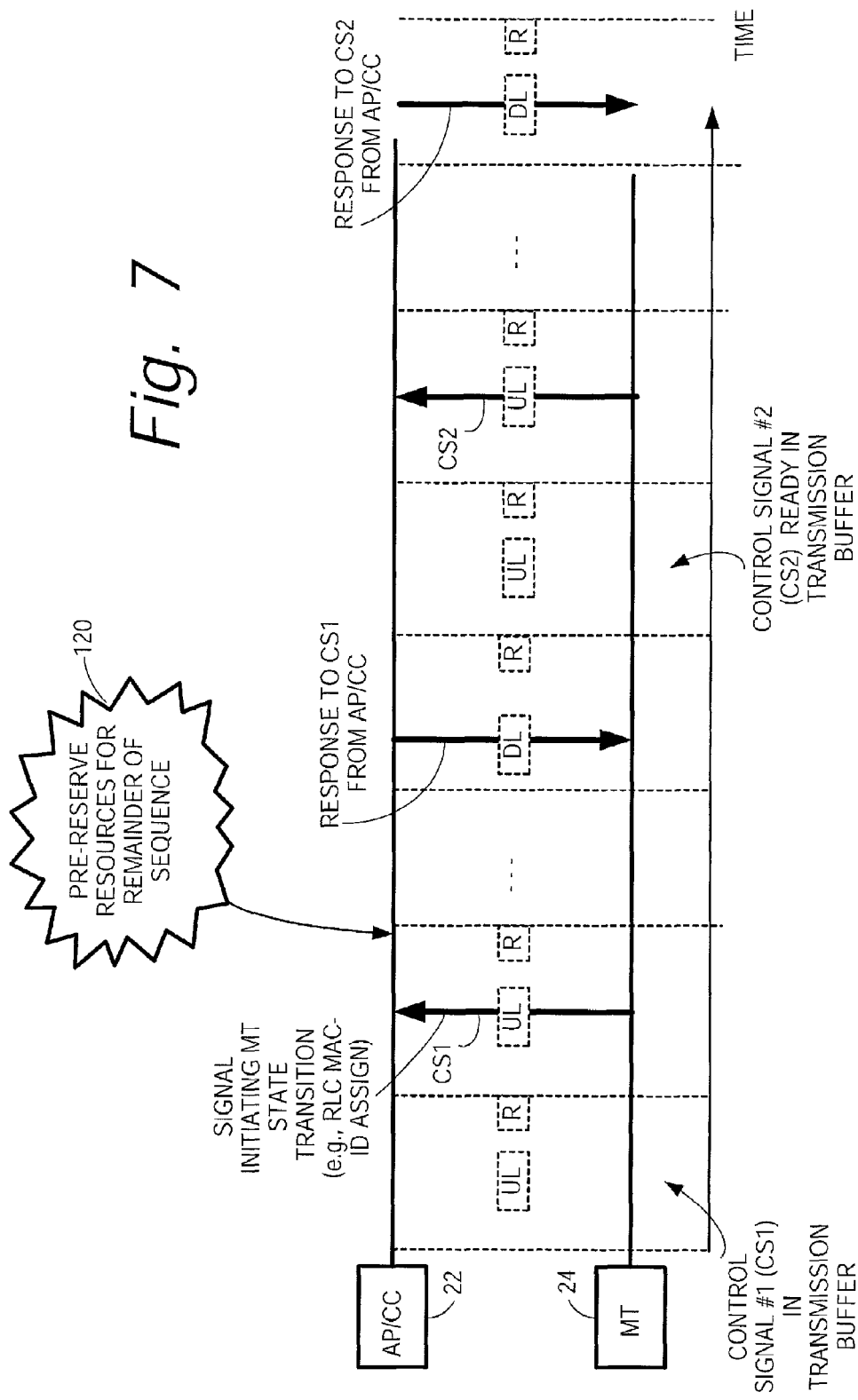
FIG. 7 is a more detailed timing diagram depicting resource pre-reservation and transmission of a control signal of an association sequence in accordance with FIG. 6.

In FIG. 7, the shadowed UL areas are unused UL allocations, hereby assuming a simple solution where the AP/CC simply allocates a fixed running allocation for UL control signals until the resources can be freed for other purposes. When using this mechanism of temporarily allocating "fixed" UL resources for mobile terminal (MT) 24 during state transitions, the AP/CC should allocate resources for the complete message exchange (i.e. until the desired end state is reached). Such allocation combats the delays otherwise added for every individual UL RLC LCH signal (including possible RLC retransmissions).

From FIG. 6 and FIG. 7 it can be seen that the total association delay is simply provided by Expression 4. In Expression 4, T_RLC_Processing is the time needed for processing of the information contents of the RLC messages.

$$T_A = T\_RLC\_Processing \qquad \text{Expression 4}$$

In one of its aspects, the central controller (CC) 22 temporarily pre-reserves the MAC resource(s). For example, in one mode of the invention illustrated in FIG. 6A, the central controller (CC) 22A pre-reserves the MAC resource(s) for a predetermined time. Such predetermined time can be a default value stored at mobile terminal (MT) 24, and can be based, for example, upon historical or empirically determined data for completion of the state transitions by an average mobile terminal. Upon expiration of the predetermined time, the central controller (CC) reverts to a non-pre-reservation allocation scheme (e.g., reverts to the prior art practice of requiring RACH resource request messages in order to allocate MAC resources).

Figure 6A:
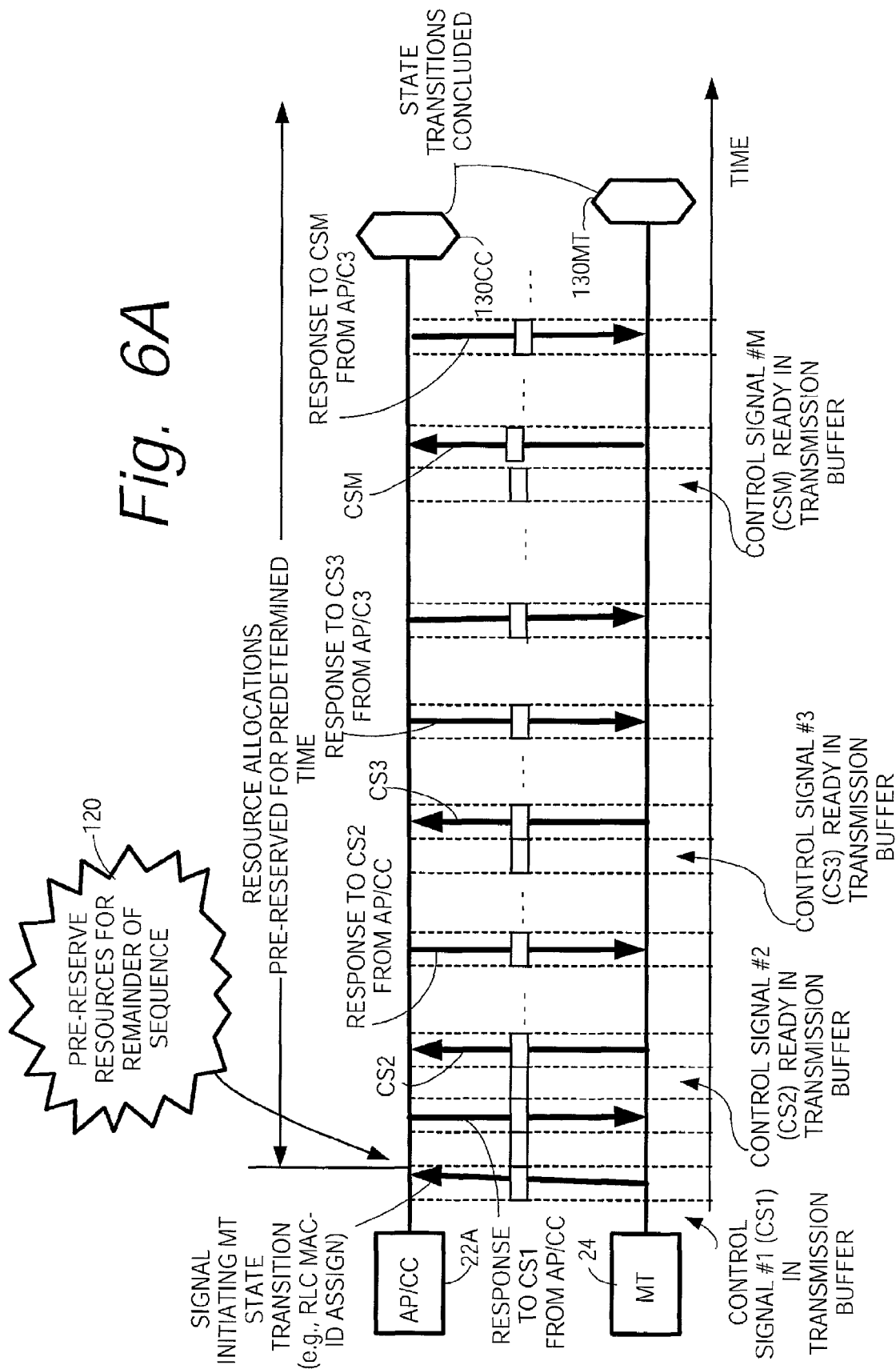
FIG. 6A is a timing diagram depicting temporary resource pre-reservation and transmission of a sequence of control signals in accordance with a first example mode the present invention.
Figure 6B:
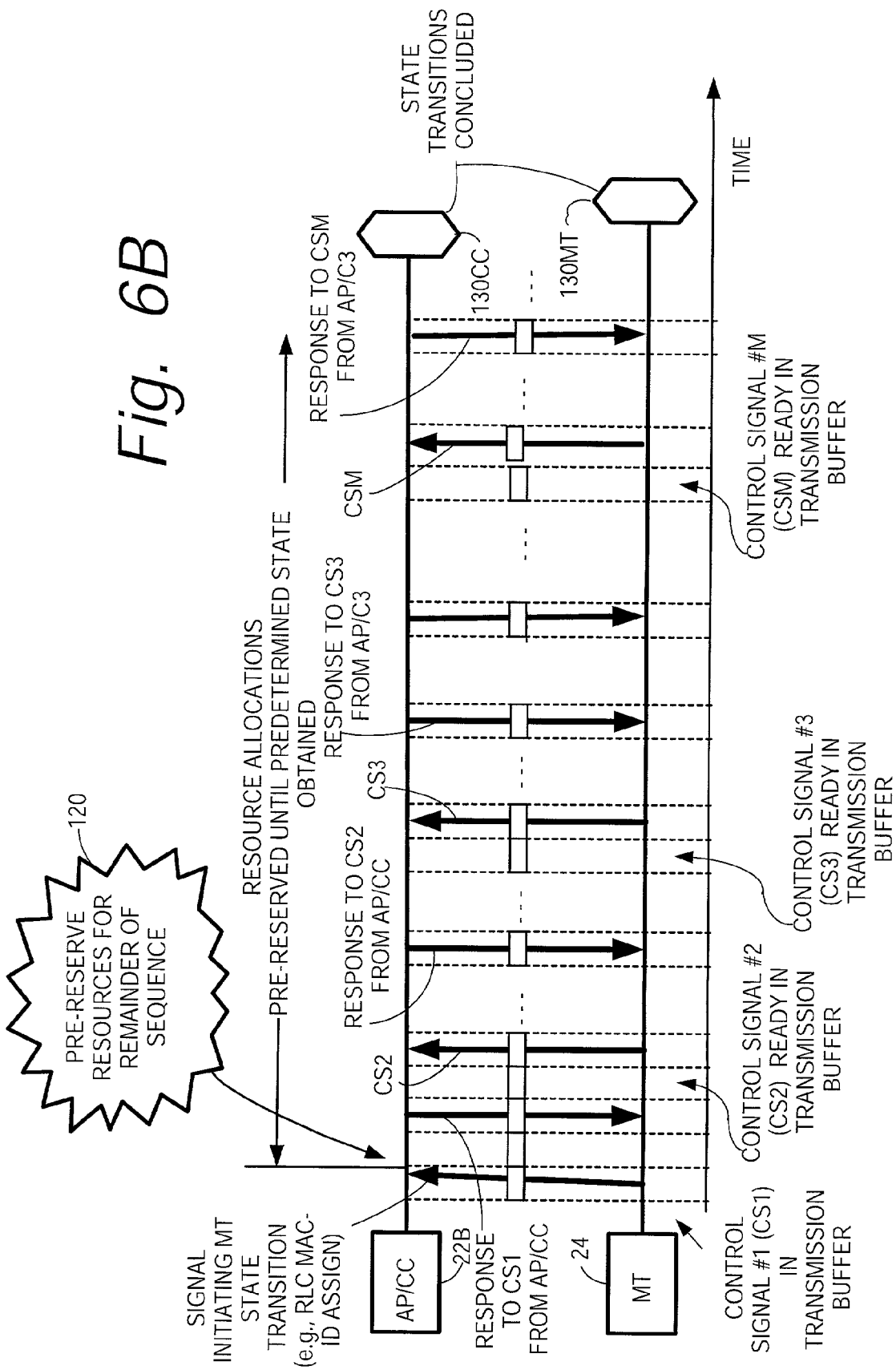
FIG. 6B is a timing diagram depicting temporary resource pre-reservation and transmission of a sequence of control signals in accordance with a second example mode the present invention.

In another mode of the invention illustrated in FIG. 6B, the central controller (CC) 22B pre-reserves the MAC resource(s) until a predetermined state transition has occurred. For example, central controller (CC) 22B pre-reserves the MAC resource(s) until central controller (CC) 22B receives a signal from mobile terminal (MT) 24 by which central controller (CC) 22B can conclude that the mobile terminal has successfully entered a predetermined state.

Figure 8A:
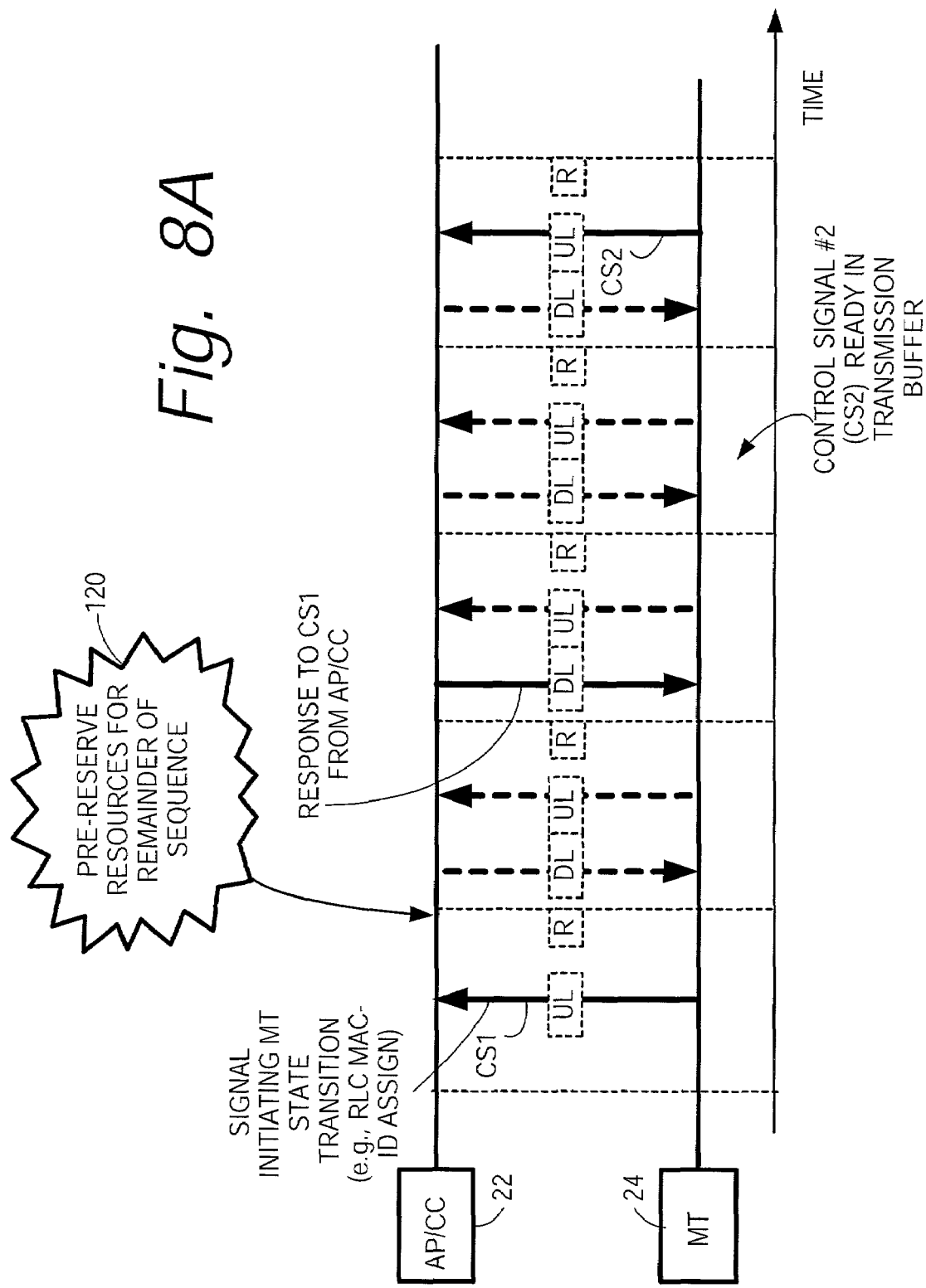
FIG. 8A is a timing diagram showing resource pre-reservation in accordance with another mode of the invention.

Another aspect of the invention involves the periodicity of occurrence of the MAC resources pre-reserved by the central controller (CC) 22. In one mode, illustrated in FIG. 8A, the central controller (CC) 22 pre-reserves the MAC resource(s) in each (e.g., every) MAC frame. Thus, in the FIG. 8A example, while both uplink and downlink MAC resources have been pre-reserved in the second MAC frame (as shown by the broken line arrows), neither of the DCCHs corresponding to these resources are utilized in the second frame. The third frame of FIG. 8A shows the response to the first control signal CS1 being transmitted in the pre-reserved downlink DCCH (indicated by the solid arrow in the third frame). Although resources are pre-reserved in the fourth frame, none are utilized by the association sequence since the content information for the second control signal CS2 has just been stored in transmission buffer 58. In the fifth frame, the uplink DCCH pre-reserved for the association sequence is utilized as mobile terminal (MT) 24 sends the third control signal CC3.

In another mode, illustrated in FIG. SB, central controller (CC) 22 pre-reserves the MAC resource in a number of MAC frames in accordance with a predetermined rule (other than for every frame). The particular example of FIG. 8B has central controller (CC) 22 preserving MAC resource(s) in every second MAC frame (e.g., every other MAC frame). Thus, for the illustrated example of FIG. 8B, the predetermined rule is every second MAC frame). Thus, pre-reservation function 100 has pre-reserved MAC resources (e.g., uplink and downlink DCCHs) in the third and fifth frames shown in FIG. 8B. In the third frame the central controller (CC) 22 responds to the first control signal CS1, and in the fifth frame mobile terminal (MT) 24 sends the second control signal CS2 to central controller (CC) 22 (the informational content for the second control signal CS2 having been stored in transmission buffer 58 at the time of the fourth frame.

Figure 8B:
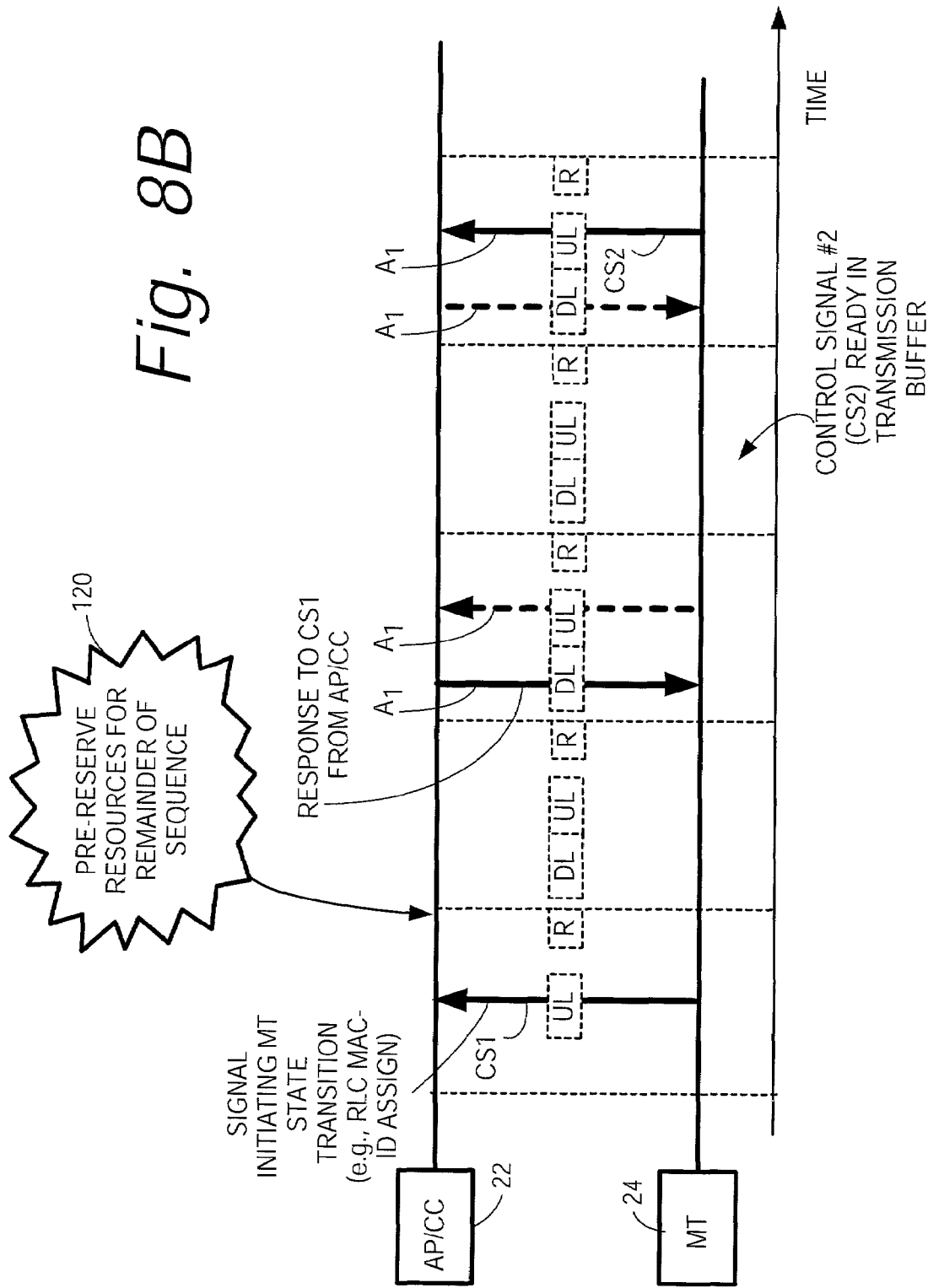
FIG. 8B is a timing diagram showing resource pre-reservation in accordance with yet another mode of the invention.

In the FIG. 8B mode, if the informational content for the second control signal CS2 were instead only stored in transmission buffer 58 at the time of the fifth frame, the mobile terminal (MT) 24 would have to wait until the seventh frame in order to transmit the second control signal CS2, since the pre-reservation function 100 did not pre-reserve any MAC resources in the even frames (e.g., the sixth frame could not be utilized).

While some of the illustrations provided above have focused on the initial association scenario, it should be understood that the principles of the invention are equally applicable to the handover scenario. In fact, the benefits of decreasing the state transition delay are likely even more important for handover than for initial association. This since it is now more likely that a user has ongoing activities/transactions where an interrupt in the service quality could cause inconvenience.

It should be understood that the pre-reservation performed by pre-reservation function 100 need not be limited to MAC resources which are utilized in the association operation (e.g., not limited to facilitating transmission of control signals), but can also extend to user data. That is, as shown in FIG. 9, the pre-reservation function 100 of central controller (CC) 22 can also pre-reserve (at least temporarily) user data channels (s) and/or LCCHs to be used in transmitting user data between central controller (CC) 22 and mobile terminal (MT) 24 after the association sequence is completed. In so doing, the central controller (CC) 22 essentially changes its resource allocation scheme for user data channels from, e.g., a basic type of allocation, to a fixed capacity allocation. Thus, the central controller (CC) 22 is not only responsible for association administration, but also for the dynamic allocation of UL (& DL) resources, with both resources for user and control data being dynamically allocated by the AP/CC.

Thus, as explained above, the association state handler 42 in the central controller (CC) 22 reacts upon receipt of messages from mobile terminal (MT) 24 for which a certain amount of necessary resources can be predicted. In the illustrated examples, such predication-spawning messages were the RLC association and handover messages, RLC_MAC-ID_ASSIGN and RLC_HANDOVER_REQ, respectively. Based on this detection/prediction, the central controller (CC) 22 at least temporarily pre-reserves the MAC resources so that the requesting entity (e.g., mobile terminal (MT) 24) can avoid having to use separate and additional resource request messages over the RACH. As a result of the pre-reservation performed by pre-reservation function 100, the mobile terminal (MT) 24 may directly send RLC messages in the allocated opportunities (e.g., the pre-reserved DCCHs).

The duration for the temporarily allocated resources may be set to a fixed time as in the FIG. 6A mode so that, upon expiration, causes the central controller (CC) 22 to revert to its normal resource allocation scheme. The temporary allocation duration may also be based on state transition in the manner shown, e.g., in FIG. 6B, when the central controller (CC) 22 receives a message indicating that the requesting entity successfully has entered the new state. The duration for the temporary resource allocation may also be based on a combination of fixed time and state transition, or any other combination.

By using temporarily pre-reserved allocations for control signaling, the time of inactivity in an association operation can be minimized. Such will contribute, e.g., to making a handover as seamless to a user as possible. Moreover, by utilizing temporarily pre-reserved allocations for control data and user data in accordance with the invention, user data latency can be minimized.

As employed herein, the central controller (CC) essentially concerns the function of administrating the MAC, including the handling of resources. As indicated earlier, the central controller (CC) is, in most cases, synonymous with an access point (AP). However, the central controller (CC) could reside in various locations, conceivably even in the mobile terminal (MT) even though the mobile terminal (MT) is not connected to the network.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A wireless local area network (LAN) comprising:
   a central controller;
   a mobile terminal comprising:
      a transceiver;
      a transmission buffer configured to store information to be included in a control signal; and
      a MAC logic unit which, via the transceiver, is configured to send a sequence of control signals to the central controller in a MAC protocol for associating the mobile terminal with the central controller prior to sending/receiving user data, a first control signal of the sequence being a radio link control signal;
   wherein the central controller, upon receipt of the first control signal of the sequence on a dedicated control channel, is configured to predict what MAC resources will be necessary for completion of the sequence and to pre-reserve a MAC resource for transmission of the sequence prior to information for a further control signal being stored in the transmission buffer of the mobile terminal.

2. The apparatus of claim 1, wherein the MAC resource which is pre-reserved by the central controller includes one of: (1) an uplink Dedicated Control Channel (DCCH) Long Channel (LCH); (2) an uplink Dedicated Control Channel (DCCH) Short Channel (SCH); (3) a downlink Dedicated Control Channel (DCCH) Long Channel (LCH); (4) a downlink Dedicated Control Channel (DCCH) Short Channel (SCH); and (5) a combination of (1), (2), (3), or (4).

3. The apparatus of claim 1, wherein the central controller is configured to pre-reserve the MAC resources for transmission of remaining control signals of the sequence prior to information for the remaining control signals being stored in the transmission buffer of the mobile terminal.

4. The apparatus of claim 1, wherein the central controller is configured to pre-reserve the MAC resource to avoid transmission of a separate message to request a MAC resource for the further control signal.

5. The apparatus of claim 1, wherein the central controller is configured to notify the mobile terminal that the central controller has pre-reserved the MAC resource.

6. The apparatus of claim 1, wherein the central controller is configured to temporarily pre-reserve the MAC resource.

7. The apparatus of claim 6, wherein the central controller is configured to pre-reserve the MAC resource for a predetermined time.

8. The apparatus of claim 7, wherein upon expiration of the predetermined time the central controller is configured to revert to a non-pre-reservation allocation scheme.

9. The apparatus of claim 6, wherein the central controller is configured to pre-reserve the MAC resource until a predetermined state transition has occurred.

10. The apparatus of claim 9, wherein the central controller is configured to pre-reserve the MAC resource until the central controller receives a signal from which the central controller can conclude that the mobile terminal has successfully entered a predetermined state.

11. The apparatus of claim 1, wherein the central controller is configured to pre-reserve the MAC resource in each MAC frame.

12. The apparatus of claim 1, wherein the central controller is configured to pre-reserve the MAC resource in a number of MAC frames in accordance with a predetermined rule.

13. The apparatus of claim 12, wherein the predetermined rule is that the central controller pre-reserves the MAC resource in every second MAC frame.

14. The apparatus of claim 1, wherein the central controller is also configured to pre-reserve resources for user data to be used in transmitting user data between the central controller and the mobile terminal after the sequence is completed.

15. The apparatus of claim 1, wherein the sequence is an association sequence for an initial association operation of the mobile terminal with the central controller, and wherein in the initial association operation the mobile terminal transitions through a series of association states prior to user data exchange.

16. The apparatus of claim 1, wherein the sequence is an association sequence for a handover operation of the mobile terminal with the central controller, and wherein in the initial association operation the mobile terminal transitions through a series of association states prior to user data exchange.

17. The apparatus of claim 1, wherein all control signals of the sequence are dedicated control channel radio link control signals.

18. The apparatus of claim 1, wherein the sequence comprises radio link control signals for facilitating either one or both of encryption key exchange and authentication.

19. For use in a wireless local area network (LAN) comprising a central controller and a mobile terminal, a method comprising:
   the mobile terminal sending, on a dedicated control channel, a first control signal of a sequence of control signals to the central controller in conjunction with an association operation whereby the mobile terminal is associated with the central controller, the first control signal of the sequence being a radio link control signal;
   upon receipt of the first control signal, the central controller predicting what MAC resources will be necessary for completion of the sequence and pre-serving a MAC resource for transmission of the sequence prior to information for a further control signal being stored in a transmission buffer of the mobile terminal.

20. The method of claim 19, further comprising the central controller anticipating the further control signal and pre-reserving the MAC resource.

21. The method of claim 19, wherein the MAC resource which is pre-reserved by the central controller includes one of: (1) an uplink Dedicated Control Channel (DCCH) Long Channel (LCH); (2) an uplink Dedicated Control Channel (DCCH) Short Channel (SCH); (3) a downlink Dedicated Control Channel (DCCH) Long Channel (LCH); (4) a downlink Dedicated Control Channel (DCCH) Short Channel (SCH); and (5) a combination of (1), (2), (3), or (4).

22. The method of claim 19, further comprising the central controller pre-reserving the MAC resources for transmission of remaining control signals of the sequence prior to information for the remaining control signals being stored in the transmission buffer of the mobile terminal.

23. The method of claim 19, further comprising the central controller pre-reserving the MAC resource to avoid transmission of a separate message to request a MAC resource for the further control signal.

24. The method of claim 19, further comprising the central controller notifying the mobile terminal that the central controller has pre-reserved the MAC resource.

25. The method of claim 19, further comprising the central controller temporarily pre-reserving the MAC resource.

26. The method of claim 25, further comprising the central controller pre-reserves the MAC resource for a predetermined time.

27. The method of claim 26, further comprising, upon expiration of the predetermined time, the central controller reverting to a non-pre-reservation allocation scheme.

28. The method of claim 25, further comprising the central controller pre-reserving the MAC resource until a predetermined state transition has occurred.

29. The method of claim 28, further comprising the central controller pre-reserving the MAC resource until the central controller receives a signal from which the central controller can conclude that the mobile terminal has successfully entered a predetermined state.

30. The method of claim 19, further comprising the central controller pre-reserving the MAC resource in each MAC frame.

31. The method of claim 19, further comprising the central controller pre-reserving the MAC resource in a number of MAC frames in accordance with a predetermined rule.

32. The method of claim 31, wherein the predetermined rule is that the central controller pre-reserves the MAC resource in every second MAC frame.

33. The method of claim 19, further comprising the central controller also pre-reserving resources for user data to be used in transmitting user data between the central controller and the mobile terminal after the sequence is completed.

34. The method of claim 19, wherein the association operation is for an initial association operation of the mobile terminal with the central controller, and wherein in the initial association operation the mobile terminal transitions through a series of association states prior to user data exchange.

35. The method of claim 19, wherein the association operation is for a handover operation of the mobile terminal with the central controller, and wherein in the initial association operation the mobile terminal transitions through a series of association states prior to user data exchange.

36. The method of claim 19, wherein radio link control signals of the sequence including the further radio link control signal are dedicated control channel radio link control signals.

37. The method of claim 19, wherein the sequence comprises radio link control signals for facilitating either one or both of encryption key exchange and authentication.

38. A central controller of a wireless local area network (LAN) which, in conjunction with an association operation with a mobile terminal and upon receiving from the mobile terminal, on a dedicated control channel, a first control signal of a sequence of control signals, is configured to predict what MAC resources will be necessary for completion of the sequence and to pre-reserve a MAC resource for transmission of the sequence prior to information for a further control signal being stored in a transmission buffer of the mobile terminal, the first control signal of the sequence being a radio link control signal.

39. The apparatus of claim 38, wherein the central controller is configured to anticipate the further control signal and pre-reserves the MAC resource.

40. The apparatus of claim 38, wherein the MAC resource which is pre-reserved by the central controller includes one of: (1) an uplink Dedicated Control Channel (DCCH) Long Channel (LCH); (2) an uplink Dedicated Control Channel (DCCH) Short Channel (SCH); (3) a downlink Dedicated Control Channel (DCCH) Long Channel (LCH); (4) a downlink Dedicated Control Channel (DCCH) Short Channel (SCH); and (5) a combination of (1), (2), (3), or (4).

41. The apparatus of claim 38, wherein the central controller is configured to pre-reserve the MAC resources for transmission of remaining control signals of the sequence prior to information for the remaining control signals being stored in the transmission buffer of the mobile terminal.

42. The apparatus of claim 38, wherein the central controller is configured to pre-reserve the MAC resource to avoid transmission of a separate message to request a MAC resource for the further control signal.

43. The apparatus of claim 38, wherein the central controller is configured to notify the mobile terminal that the central controller has pre-reserved the MAC resource.

44. The apparatus of claim 38, wherein the central controller is configured to temporarily pre-reserve the MAC resource.

45. The apparatus of claim 44, wherein the central controller is configured to pre-reserve the MAC resource until a predetermined state transition has occurred.

46. The apparatus of claim 45, wherein the central controller is configured to pre-reserve the MAC resource until the central controller receives a signal from which the central controller can conclude that the mobile terminal has successfully entered a predetermined state.

47. The apparatus of claim 44, wherein the central controller is configured to pre-reserve the MAC resource for a predetermined time.

48. The apparatus of claim 47, wherein upon expiration of the predetermined time the central controller is configured to revert to a non-pre-reservation allocation scheme.

49. The apparatus of claim 38, wherein the central controller is configured to pre-reserve the MAC resource in each MAC frame.

50. The apparatus of claim 38, wherein the central controller is configured to pre-reserve the MAC resource in a number of MAC frames in accordance with a predetermined rule.

51. The apparatus of claim 50, wherein the predetermined rule is that the central controller pre-reserves the MAC resource in every second MAC frame.

52. The apparatus of claim 38, wherein the central controller also configured to pre-reserve resources for user data to be used in transmitting user data between the central controller and the mobile terminal after the sequence is completed.

53. The apparatus of claim 38, wherein the association operation is for an initial association operation of the mobile terminal with the central controller, and wherein in the initial association operation the mobile terminal transitions through a series of association states prior to user data exchange.

54. The apparatus of claim 38, wherein the association operation is for a handover operation of the mobile terminal with the central controller, and wherein in the initial association operation the mobile terminal transitions through a series of association states prior to user data exchange.

55. The apparatus of claim 38, wherein radio link control signals of the sequence including the further radio link control signal are dedicated control channel radio link control signals.

56. The apparatus of claim 38, wherein the sequence comprises radio link control signals for facilitating either one or both of encryption key exchange and authentication.

* * * * *

UNITED STATES PATENT AND TRADEMARK OFFICE
CERTIFICATE OF CORRECTION

| | |
|---|---|
| PATENT NO. | : 7,570,952 B2 |
| APPLICATION NO. | : 09/948702 |
| DATED | : August 4, 2009 |
| INVENTOR(S) | : Woxberg et al. |

It is certified that error appears in the above-identified patent and that said Letters Patent is hereby corrected as shown below:

In Column 7, Line 10, delete "LCCHs)" and insert -- LCHs) --, therefor.

In Column 9, Line 63, after "24" delete "of the MAC frame]".

In Column 13, Line 37, delete "SB," and insert -- 8B, --, therefor.

In Column 14, Line 11, delete "LCCHs" and insert -- LCHs --, therefor.

In Column 14, Lines 20-21, delete "UL (&DL)" and insert -- (UL & DL) --, therefor.

Signed and Sealed this

Twenty-fourth Day of November, 2009

David J. Kappos
*Director of the United States Patent and Trademark Office*